United States Patent
Parikh et al.

(10) Patent No.: US 10,331,467 B2
(45) Date of Patent: Jun. 25, 2019

(54) SYSTEM AND METHOD FOR PERFORMING UNIVERSAL RESOURCE MANAGEMENT OPERATIONS FOR DIFFERENT VIRTUALIZED COMPUTING ENVIRONMENTS

(71) Applicant: VMware, Inc., Palo Alto, CA (US)

(72) Inventors: Aashish Parikh, Cupertino, CA (US); Mustafa Uysal, Fremont, CA (US); Parth Shah, Mountain View, CA (US)

(73) Assignee: VMWARE, INC., Palo Alto, CA (US)

( * ) Notice: Subject to any disclaimer, the term of this patent is extended or adjusted under 35 U.S.C. 154(b) by 371 days.

(21) Appl. No.: 14/333,400

(22) Filed: Jul. 16, 2014

(65) Prior Publication Data
US 2016/0021019 A1    Jan. 21, 2016

(51) Int. Cl.
*G06F 13/00* (2006.01)
*G06F 9/455* (2018.01)
*H04L 12/24* (2006.01)

(52) U.S. Cl.
CPC ...... *G06F 9/45558* (2013.01); *H04L 41/0896* (2013.01); *G06F 2009/45595* (2013.01); *H04L 41/5009* (2013.01); *H04L 41/5054* (2013.01); *H04L 41/5096* (2013.01)

(58) Field of Classification Search
CPC ...... G06F 9/505; G06F 9/5083; G06F 9/5088; G06F 9/46; G06F 9/5072; G06F 9/45558; G06F 13/00; G06F 15/173; G06F 2209/508; G06F 2209/509; G06F 2009/45595; G06Q 10/107; H04L 12/58; H04L 12/581; H04L 12/585; H04L 12/5855; H04L 29/08144; H04L 29/08171; H04L 12/5695; H04L 29/06; H04L 29/08072; H04L 41/0896; H04L 41/5009; H04L 41/5054; H04L 41/5096
USPC .......................................... 709/226; 718/105
See application file for complete search history.

(56) References Cited

U.S. PATENT DOCUMENTS

2012/0204187 A1\* 8/2012 Breiter .................. G06F 9/5072
718/105
2014/0059229 A1    2/2014 Parikh

OTHER PUBLICATIONS

VMware vSphere with Operations Management, http://www.vmware.com/products/vsphere-operations-management/ accessed Oct. 14, 2014.
VMware vCloud Automation Center, http://www.vmware.com/products/vcloud-automation-center/; snapshot of Dec. 2, 2013 via web.archive.org, accessed Oct. 14, 2014.
(Continued)

*Primary Examiner* — Robert B Harrell
(74) *Attorney, Agent, or Firm* — Thomas Horstemeyer, LLP

(57) ABSTRACT

A universal resource management system and method for performing resource management operations for different computing environments uses a universal snapshot of the different computing environments to perform a resource management analysis to produce at least one recommended action for the different computing environments. The universal snapshot is created using state information collected from the different computing environments. The recommended action is then implemented in at least one of the different computing environments.

15 Claims, 7 Drawing Sheets

(56) References Cited

OTHER PUBLICATIONS

Gulati, Ajay et al., "VMware Distributed Resource Management: Design, Implementation, and Lessons Learned"; VMware Technical Journal, vol. 1, No. 1, Apr. 2012.
Manpathak, Sachin. et al.; "Storage DRS: Automated Management of Storage Devices in a Virtualized Datacenter"; VMware Technical Journal, Winter 2012.
VMware Distributed Power Management: Concepts and Usage, http://www.vmware.com/resources/techresources/1080, copyright 2010.

* cited by examiner

SYSTEM AND METHOD FOR PERFORMING UNIVERSAL RESOURCE MANAGEMENT OPERATIONS FOR DIFFERENT VIRTUALIZED COMPUTING ENVIRONMENTS

BACKGROUND

Sharing resources in a networked computer system, such as processors, computer memories, network bandwidth and data storage facilities, among clients, e.g., virtual machines (VMs), running on the system can increase efficiency by reducing maintenance and operating costs, allowing flexibility with respect to individual resource usage, and simplifying resource management. Resource sharing is a critical element for utilizing virtual datacenters to realize private, hybrid and public clouds to support various applications. However, in order to serve a disparate set of needs and to respect a diverse set of constraints, deployments of virtual datacenters are necessarily becoming more heterogeneous with respect to the underlying hardware, hypervisors and management servers used to host and manage end-user virtual machines.

One of the concerns of heterogeneous deployments of virtual datacenters for a single entity is that resource management of the underlying hardware may be handled by multiple resource management systems that manage only portions of the virtual datacenters. These multiple resource management systems add complexity to the virtual datacenters and present challenges for administrators to manage different assets owned or leased by the entity.

SUMMARY

A universal resource management system and method for performing resource management operations for different computing environments uses a universal snapshot of the different computing environments to perform a resource management analysis to produce at least one recommended action for the different computing environments. The universal snapshot is created using state information collected from the different computing environments. The recommended action is then implemented in at least one of the different computing environments.

A method for performing resource management operations for different computing environments in accordance with an embodiment of the invention comprises collecting state information of each of the different computing environments, creating a universal snapshot of all the different computing environments using the collected state information of the different computing environments, performing a resource management analysis on all the different computing environments using the universal snapshot to produce at least one recommended action for the different computing environments, and implementing the recommended action in at least one of the different computing environments. In some embodiments, the steps of this method are performed when program instructions contained in a computer-readable storage medium are executed by one or more processors.

A universal resource management system in accordance with an embodiment of the invention comprises at least one stats collection engine configured to collect state information of different computing environments, a snapshot creation module configured to create a universal snapshot of all the different computing environments using the collected state information of the different computing environments, a universal resource management engine configured to perform a resource management analysis on all the different computing environments using the universal snapshot to produce at least one recommended action for the different computing environments, and at least one execution engine configured to implement the recommended action in at least one of the different computing environments.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
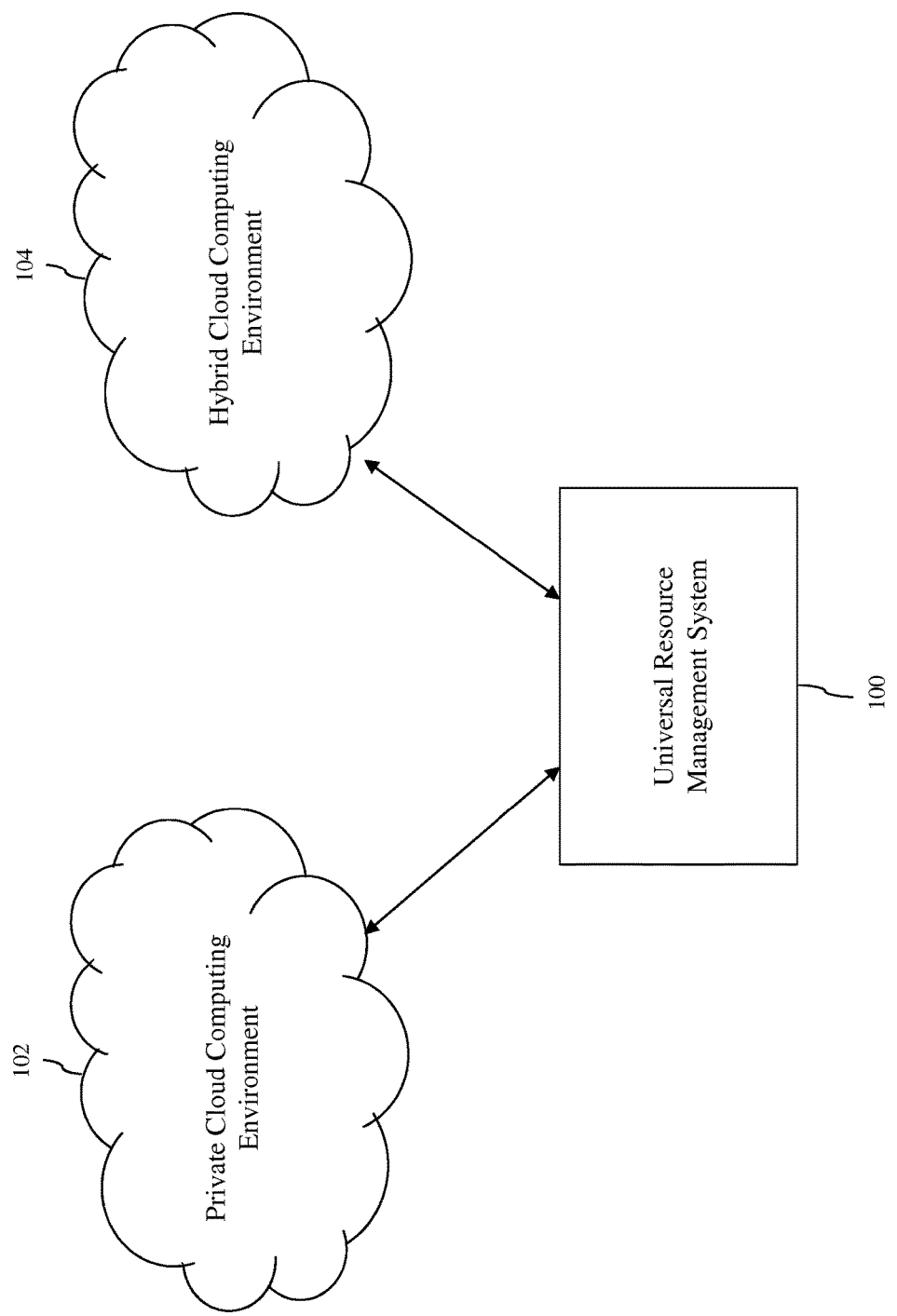
FIG. 1 illustrates a universal resource management system in accordance with a first embodiment of the invention.

Turning now to FIG. 1, a universal resource management system 100 in accordance with a first embodiment of the invention is shown. As illustrated in FIG. 1, the universal resource management system operates to provide a universal resource management solution across a private cloud computing environment 102 and a hybrid cloud computing environment, which is a portion of a public cloud leased to an entity, such as a business entity. In this embodiment, it is assumed that the same entity uses both the private and hybrid cloud computing environments, where the hybrid cloud computing environments serves as an extension of the private cloud computing environment. The universal resource management system can perform virtualized resource management operations, such as client placements, load-balancing and resource allocations, for both the private and hybrid cloud computing environment, as explained in more detail below. As used herein, the term "client" is any software entity that can run on a computer system, such as a software application, a software process or a virtual machine (VM).

The private and hybrid cloud computing environments 102 and 104 may be similar to each other with respect to the underlying hardware, which may be used to create virtual datacenters with multiple clients operating in the virtual datacenters to execute various applications. However, the private cloud computing environment is typically owned and managed by an entity, while the hybrid cloud computing environment is typically owned by a provider, which is not part of the entity running the private cloud computing environment, and leased to the entity for use. While there are similarities with respect to underlying hardware between the private and hybrid cloud computing environments, there are significant differences between them with respect to primitives, functionalities and accessible information regarding the various components of the clouds. Private and public/hybrid clouds each have primitives and functionality derived from the capabilities of their underlying virtual infrastructure. For instance, private clouds might allow direct control of the underlying virtual inventory via a management server. Public clouds might only allow indirect control of the underlying virtual inventory to the end-user through abstractions, for example, Organization Virtual Data Centers in VMware® vCloud Director® ("vCloud Director" is a registered trademark of VMware, Inc.). These abstractions allow the provider of a hybrid/public cloud to enjoy greater flexibility and control. Several primitives such as reserving resources for quality-of-service guarantees may be available in most popular private clouds. The software implementing a hybrid/public cloud and/or the administrator managing said hybrid/public cloud may not expose such functionality to the end-user. There are also differences to the scale and content of data that may be available to private and hybrid/public clouds. Due to policies that are in place to ensure compliance with local and other government laws, information such as public health records may be shared within the VMs in a secure private cloud whereas such data may not be shared in a multi-tenant hybrid/public cloud.

Figure 2:
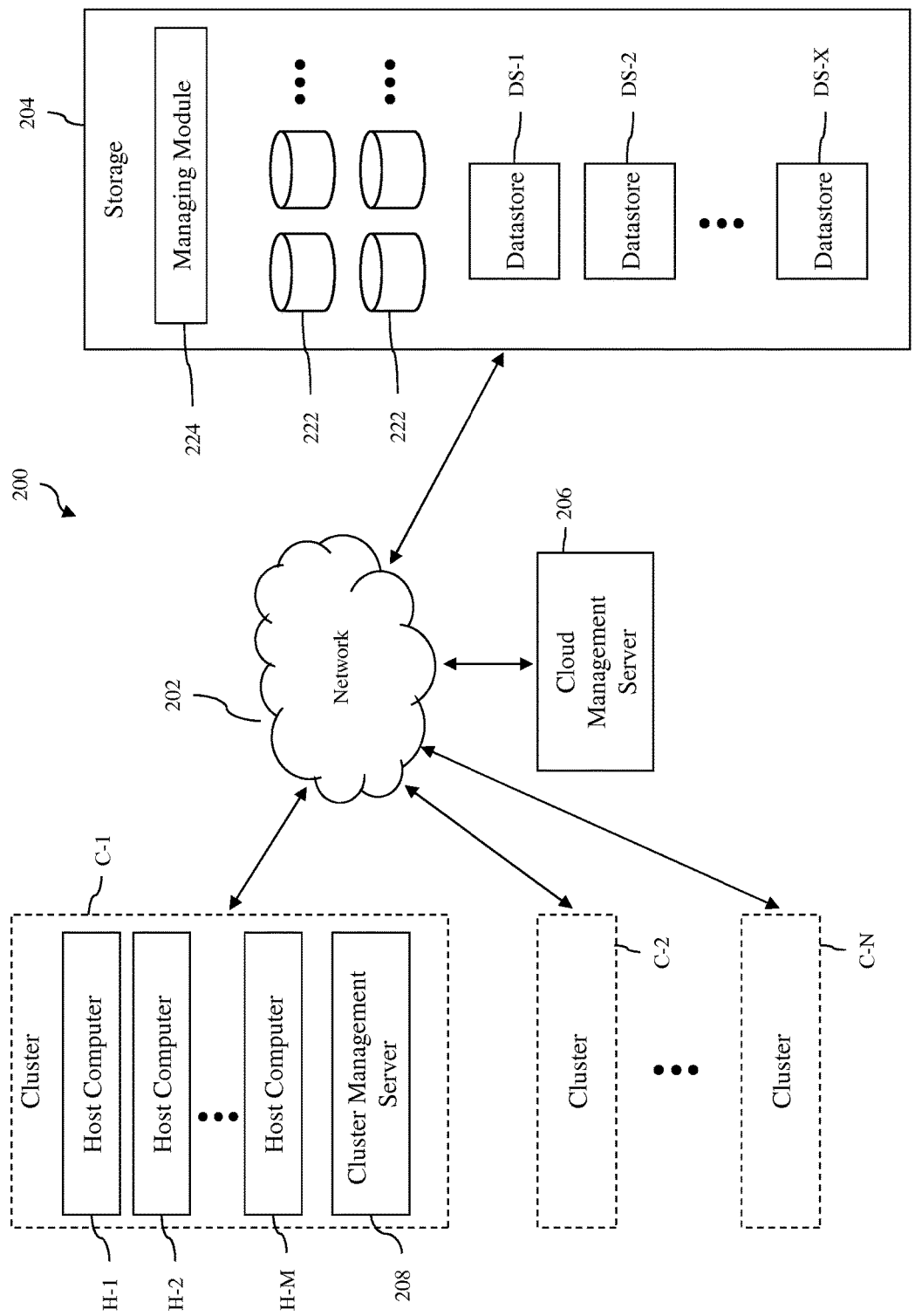
FIG. 2 is a block diagram of an infrastructure that can support a private or hybrid cloud computing environment in accordance with an embodiment of the invention.

Turning now to FIG. 2, an infrastructure 200 that can support a private or hybrid cloud computing environment, such as the private and hybrid cloud computing environments 102 and 104, in accordance with an embodiment of the invention is illustrated. As shown in FIG. 2, the infrastructure includes a network 202, clusters C-1, C-2 . . . C-N (where N is a positive integer) of host computers, storage 204 and a cloud management server 206. The clusters of host computers are used to support or host clients that can execute various applications. The exact number of host computer clusters included in the distributed computer system can be from few clusters to tens of clusters or more. The clusters may be connected to other components in the infrastructure, as well as components outside of the infrastructure, via the network. Thus, clients running in the clusters are able to communicate to any process or device connected to the network.

In the illustrated embodiment, each of the clusters C-1, C-2 . . . C-N includes a number of host computers H-1, H-2 . . . H-M (where M is a positive integer) and a cluster management server 208. The number of host computers included in each of the clusters can be any number from one to several hundred or more. In addition, the number of host computers included in each of the clusters can vary so that different clusters can have a different number of host computers. The host computers are physical computer systems that host or support one or more clients so that the clients are executing on the physical computer systems. The host computers may be servers that are commonly found in datacenters. As an example, the host computers may be servers installed in one or more server racks. In an embodiment, the host computers of a cluster are located within the same server rack. Since the clusters are connected to the network 202, each of the host computers in the clusters is able to access any process and device connected to the network. In particular, each of the host computers in the clusters is able to access the storage 204 via the network and may share the resources provided by the storage with the other host computers. Consequently, any client running on any of the host computers may also access the storage via the network.

Figure 3:
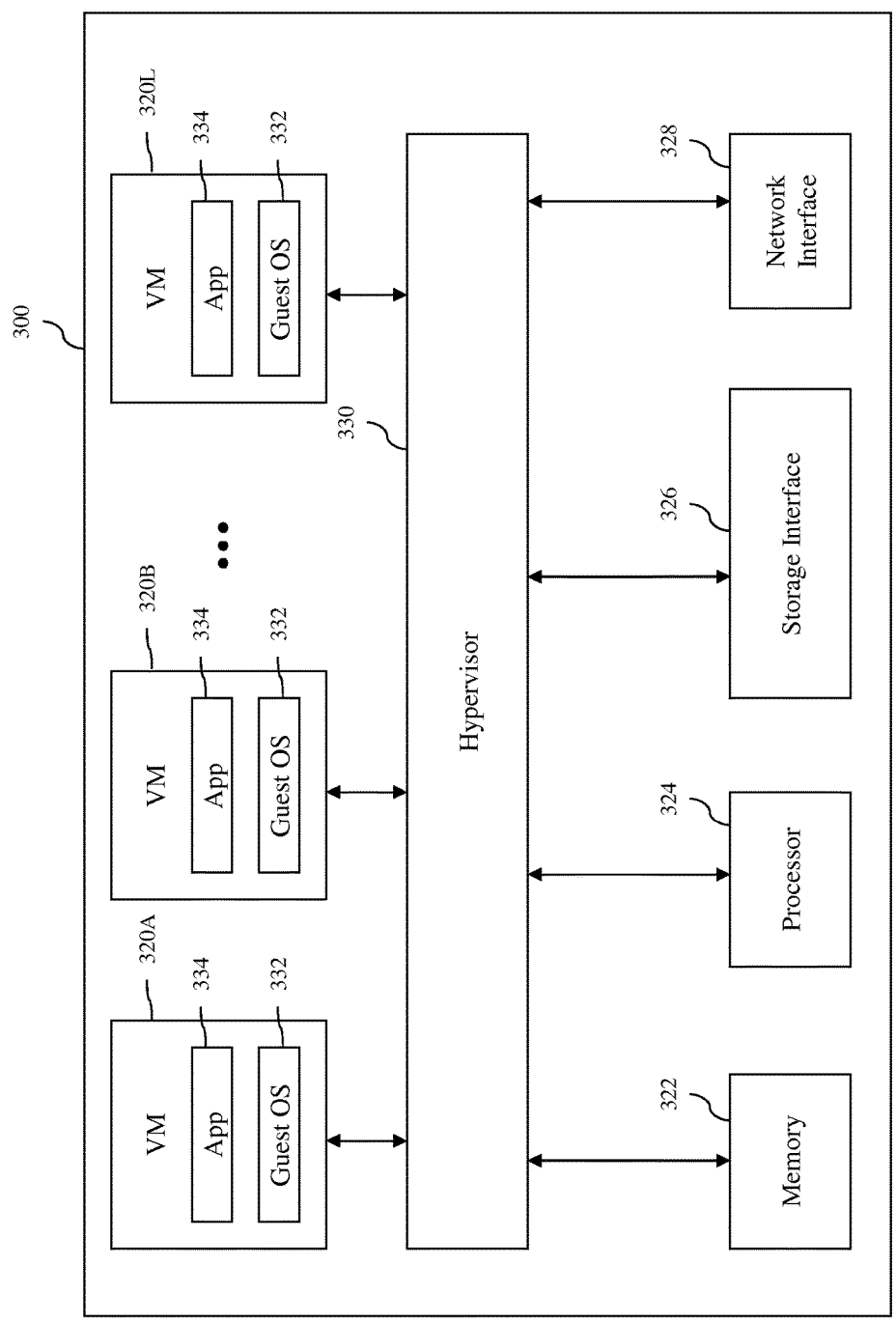
FIG. 3 is a block diagram of a host computer in accordance with an embodiment of the invention.

Turning now to FIG. 3, components of a host computer 300 that is representative of the host computers H-1, H-2 . . . H-M in accordance with an embodiment of the invention are shown. In FIG. 3, the physical connections between the various components of the host computer are not illustrated. In the illustrated embodiment, the host computer is configured to support a number of clients 320A, 320B . . . 320L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include system memory 322, one or more processors 324, a storage interface 326, and a network interface 328. The system memory 322, which may be random access memory (RAM), is the primary memory of the host computer. The processor 324 can be any type of a processor, such as a central processing unit (CPU) commonly found in a server. The storage interface 326 is an interface that allows that host computer to communicate with the storage 204. As an example, the storage interface may be a host bus adapter or a network file system interface. The network interface 328 is an interface that allows the host computer to communicate with other devices connected to the network 202. As an example, the network interface may be a network adapter.

In the illustrated embodiment, the VMs 320A, 320B . . . 320L run on top of a hypervisor 330, which is a software interface layer that enables sharing of the hardware resources of the host computer 300 by the VMs. However, in other embodiments, one or more of the VMs can be nested, i.e., a VM running in another VM. For example, one of the VMs may be running in a VM, which is also running in another VM. The hypervisor may run on top of the host computer's operating system or directly on hardware of the host computer. With the support of the hypervisor, the VMs provide virtualized computer systems that give the appearance of being distinct from the host computer and from each other. Each VM includes a guest operating system 332 and one or more guest applications 334. The guest operating system is a master control program of the respective VM and, among other things, the guest operating system forms a software platform on top of which the guest applications run.

Similar to any other computer system connected to the network 202, the VMs 320A, 320B . . . 320L are able to communicate with other computer systems connected to the network using the network interface 328 of the host computer 300. In addition, the VMs are able to access the storage 204 using the storage interface 326 of the host computer.

Turning back to FIG. 2, each of the cluster management servers 208 in the clusters C-1, C-2 . . . C-N operates to monitor and manage the host computers H-1, H-2 . . . H-M in the respective cluster. Each cluster management server may be configured to monitor the current configurations of the host computers and the clients, e.g., VMs, running on the host computers in the respective cluster. The monitored configurations may include hardware configuration of each of the host computers, such as CPU type and memory size, and/or software configurations of each of the host computers, such as operating system (OS) type and installed applications or software programs. The monitored configurations may also include client hosting information, i.e., which clients are hosted or running on which host computers. The monitored configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource parameter settings, such as demand, limit, reservation and share values for various resources, e.g., CPU, memory, network bandwidth and storage, which are consumed by the clients. The demands of the clients for the consumable resources are determined by the host computers hosting the clients by monitoring the current usage of resources by the clients, e.g., CPU processing usage, memory usage, network usage and/or storage usage, and provided to the respective cluster management server. The cluster management servers may also be configured to execute migration of clients between host computers in their respective clusters, as well as other operations to manage the their respective clusters.

In some embodiments, the cluster management servers 208 may be physical computers with each computer including at least memory and one or more processors, similar to the host computer 300. In other embodiments, the cluster management servers may be implemented as software programs running on physical computers, such as the host computer 300 shown in FIG. 3, or virtual computers, such as the VMs 320A, 320B . . . 320L. In an implementation, the cluster management servers are VMware® vCenter™ servers with at least some of the features available for such servers ("VMware" and "vCenter" are trademarks of VMware, Inc.).

The network 202 can be any type of computer network or a combination of networks that allows communications between devices connected to the network. The network 202 may include the Internet, a wide area network (WAN), a local area network (LAN), a storage area network (SAN), a fibre channel network and/or other networks. The network 202 may be configured to support protocols suited for communications with storage arrays, such as Fibre Channel, Internet Small Computer System Interface (iSCSI), Fibre Channel over Ethernet (FCoE) and HyperSCSI.

The storage 204 is used to store data for the host computers of the clusters C-1, C-2 . . . C-N, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 222, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 224, which manages the operation of the storage. In an embodiment, the storage managing module is a computer program executing on one or more physical computers in the infrastructure 200. The storage supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the clusters C-1, C-2 . . . C-N. For VMs, the datastores may be used to store virtual storage, e.g., virtual disks, used by each of the VMs, as well as other files needed to support the VMs. One or more datastores may be associated with one or more clusters. The same datastore may be associated with more than one cluster.

The cloud management server 206 operates to monitor and manage the clusters C-1, C-2 . . . C-N to provide a cloud computing environment using the host computers H-1, H-2 . . . H-M in the clusters. The cloud management server allows administrators to create and use virtual datacenters (VDCs) with specified resource requirements. A single VDC may include clients running on different host computers that are part of different clusters. Thus, in a single cluster, a group of clients running on the host computers of that cluster may belong to one VDC, while the other clients running on the host computers of the same cluster may belong to other VDCs. It is also possible that, in a single host computer, one or more clients running on that host computer belong to one VDC, while the other clients running on the same host computer belong to other VDCs. In a public cloud environment, some of the VDCs may be used by the cloud provider for administration purposes, while other VDCs are used by tenants of the public cloud as a hybrid cloud computing environment. In some embodiments, the cloud management server may be a physical computer. In other embodiments, the cloud management server may be implemented as a software program running on a physical computer or a VM, which may be part of one of the clusters C-1, C-2 . . . C-N. In an implementation to provide a private cloud computing environment, the cloud management server is a server running VMware® vCloud Director® product. In an implementation to provide a hybrid cloud computing environment, the cloud management server is a cloud management server of VMware® vCloud® Hybrid Service™ ("vCloud" and "Hybrid Service" are trademarks of VMware, Inc.).

Figure 4:
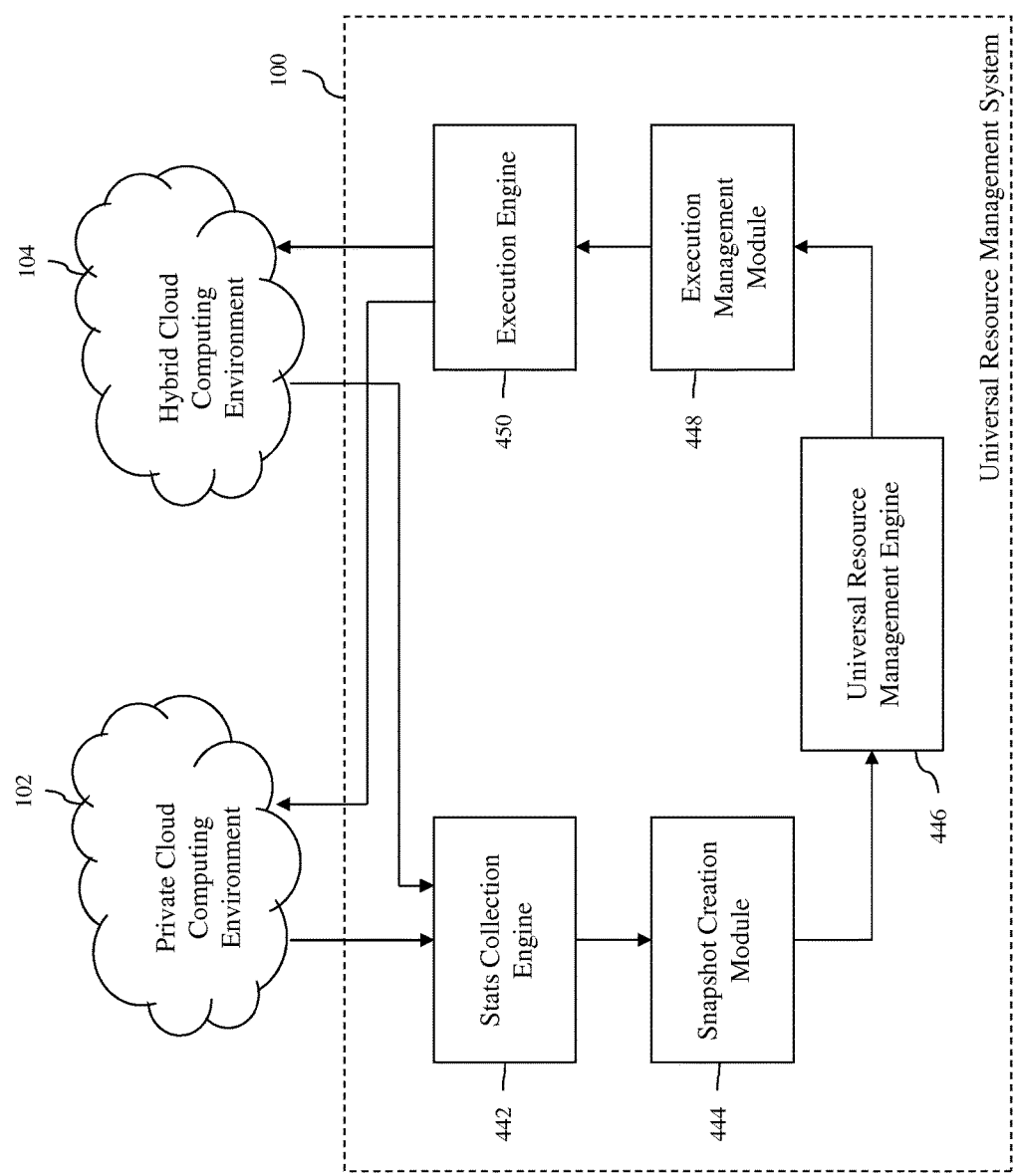
FIG. 4 shows components of the universal resource management system of FIG. 1 in accordance with an embodiment of the invention.

Turning now to FIG. 4, components of the universal resource management system 100 in accordance with an embodiment of the invention are shown. As illustrated in FIG. 4, the universal resource management system includes a stats collection engine 442, a snapshot creation module 444, a universal resource management engine 446, an execution management module 448 and an execution engine 450. The components of the universal resource management system may be implemented in any combination of hardware, software and firmware. In one implementation, these components of the universal resource management system are implemented as one or more software programs running on one or more devices with processors, which are connected to the private cloud 102 and the public cloud 104.

In the illustrated embodiment, the stats collection engine 442 of the universal resource management system 100 operates to collect state information of the private cloud computing environment 102 and state information of the hybrid cloud computing environment 104. The state information collected by the stats collection engine may include, but not limited to, (1) inventory information of the objects in the private and hybrid cloud computing environments, (2) statistics related to resource usages or demands of some or all of the inventory objects, and (3) individual configuration of some or all of the inventory objects. The inventory information for each cloud may include clients, host computers and clusters of the cloud, including their relationships, e.g., which host computers are hosting which clients and which host computers belong to which clusters. The inventory information may also include the version number, the hardware type or other attributes of the inventory objects. The statistics may include any resource usage information. As an example, the statistics collected by the stats collection engine includes, but not limited to, (a) processor or CPU statistics, such as durations when CPU was ready, free and active, (b) memory statistics, such amount of memory that was used, allocated as overhead, shared and active, and (c) other statics, such as amount of disk space used, disk input/output (I/O) latency, throughput and level of de-dupe. The individual configuration of some or all of the inventory objects may include configuration of the clients, e.g., VMs, such as resource reservations, limits and shares. The state information collected by the stats collection engine may also include policy rules, e.g., affinity and anti-affinity rules and other constraints.

In this embodiment, the stats collection engine 442 is designed or programmed to interface with the private and hybrid cloud computing environments 102 and 104. As an example, the stats collection engine may be designed to communicate with the cloud management server of the private cloud computing environment and the cloud management server of the hybrid cloud computing environment to gather the state information of the private and hybrid cloud computing environments. In an implementation, the private and hybrid cloud computing environments may be cloud computing environments realized using product and services provided by VMware, Inc. In this implementation, the cloud management server of the private cloud computing environment is a VMware® vCenter ("VMware" and "vCenter" are trademarks of VMware, Inc.) and the cloud management server of the hybrid cloud computing environment is a cloud management server of VMware® vCloud® Hybrid Service™. In addition, in this implementation, the stats collection engine is a collection engine of VMware® vCenter™ Operations Management Suite provided by VMware, Inc. ("Operations Management Suite" is a trademark of VMware, Inc.), which is able to communicate with the VMware® vCenter™ server and the cloud management server of VMware® vCloud® Hybrid Service™ to collect the state information of the private and hybrid cloud computing environments.

If the stats collection engine 442 is designed or programmed to interface with only one of the private and hybrid cloud computing environments 102 and 104, the universal resource management system 100 may include another stats collection engine that is designed or programmed to interface with the other cloud computing environment to collect state information of that cloud computing environment.

The snapshot creation module 444 of the universal resource management system 100 operates to create universal snapshots from the state information collected by the stats collection engine 442 and any other stats collection engine. Thus, the snapshot creation module produces snapshots of the private cloud computing environment 102 and snapshots of the hybrid cloud computing environment 104. In this context, a universal snapshot is a canonical representation of the inventory objects in both the private and hybrid cloud computing environments, the values of their dynamic statistics, and their options or configurations at a given time. In this embodiment, a universal snapshot at a given time can be thought of as a union or composite of a snapshot of the private cloud computing environment at that given time and a snapshot of the hybrid cloud computing environment at that same given time. It is noted here that different kinds of statistics may be collected for the two clouds. Thus, the information about the private cloud computing environment in a universal snapshot may be different than the information about the hybrid cloud computing environment in the universal snapshot.

The universal resource management engine 446 of the universal resource management system 100 executes a universal resource management algorithm that converts the universal snapshots from the snapshot creation module 444 into abstract mathematical models to perform resource management analyses. In an embodiment, the process of converting the universal snapshots from the snapshot creation module into abstract mathematical models to perform resource management analyses is similar to the process performed by VMware vSphere® Distributed Resource Scheduler™ (DRS) ("VMware vSphere" and "Distributed Resource Scheduler" are trademarks of VMware, Inc.). As the universal snapshot is a union of two possible snapshots from two different sources, the universal resource management algorithm can be imagined as a union of a family of corresponding algorithms that are able to operate on the snapshots to provide a host of resource management solutions that include, but not limited to:

1. initial client placement,
2. load-balancing,
3. constraint correction (business rules),
4. constraint correction (compatibility and licensing),
5. orderly evacuation of clients for maintenance,
6. resource pool management,
7. power management,
8. proactive resource management, and
9. SLO-aware resource management via horizontal/vertical auto-scaling.

The solutions that can be provided by the universal resource management engine 446 depend on the type of state information collected in the universal snapshot for each of the private and hybrid cloud computing environments 102 and 104 and the levels of various levels of granularity and sophistication in the collected information. In addition, the capabilities of the platform of each of the cloud computing environments will dictate the solutions that may be provided by the universal resource management engine. Thus, the universal resource management engine needs to capture the correct amount of details into its math model and to keep track of the capabilities of the private and hybrid cloud computing environments to provide the right resource management solutions for the private and hybrid cloud computing environments.

The results of the resource management analyses performed by the universal resource management engine 446 is a set of recommendations that are made available in the form of recommendation decks. These decks contain compound recommendations that encapsulate dependencies within individual "actions" and, if necessary, ordering between recommendations. As used herein, "actions" are the basic operations that may be performed on a resource consumer or producer. Not all actions are available on all platforms, and thus, the universal resource management engine need to consider the available actions for the private and hybrid cloud computing environments 102 and 104. The types of actions that may be recommended by the universal resource management engine include, but are not limited to:

1. client power-on,
2. client power-off,
3. client cold-migrate (relocate),
4. client live-migrate,
5. host power-on,
6. host power-off,
7. resource setting action (resource pool management),
8. virtual storage, e.g., virtual disk, placement,
9. virtual disk live-migration,
10. composite client and virtual storage operations, and
11. dynamic client/host group membership (tags) for constrained placements The execution management module 448 of the universal resource management system 100 operates to determine which actions recommended by the universal resource management engine 446 are to be performed in which cloud computing environment. The execution management module receives the recommended actions from the universal resource management engine and selects which recommended actions needs to be performed in the private cloud computing environment 102 and which recommended actions needs be performed in the hybrid cloud computing environment 104. The execution management module then sends the recommended actions to one or more execution engines, which can implement the recommended actions in the appropriate cloud computing environment.

In the illustrated embodiment, the execution engine 450 of the universal resource management system 100 interfaces with the private cloud computing environment 102 and the public cloud computing environment 104 to implement the actions recommended for the private and hybrid clouds by the universal resource management engine 446. The recommended actions may be automatically implemented by the execution engine. Alternatively, the recommended actions may be presented to an administrator for acceptance, and only the accepted recommended actions are then implemented by the execution engine. In a particular implementation, the execution engine is an execution engine of VMware® vCloud® Automation Center™ provided by VMware, Inc. ("Automation Center" is a trademark of VMware, Inc.), which is able to perform the recommended actions on multiple platforms. In an embodiment, the execution engine interface with the cloud management server of the private cloud computing environment and the cloud management server of the hybrid cloud computing environment to execute at least some of the recommended actions.

If the execution engine 450 is designed or programmed to interface with only one of the private cloud computing environment 102 and the public cloud computing environment 104, the universal resource management system 100 may include another execution engine that is designed or programmed to interface with the other cloud computing environment to implement the actions recommended for that cloud computing environment.

In this manner, the universal resource management system 100 is able to collect information regarding both the private and hybrid cloud computing environments 102 and 104, perform resource management analyses for the entire environment provided by the private and hybrid cloud computing environments, and implement any actions recommended for these cloud computing environments as a result of the resource management analyses.

Figure 5:
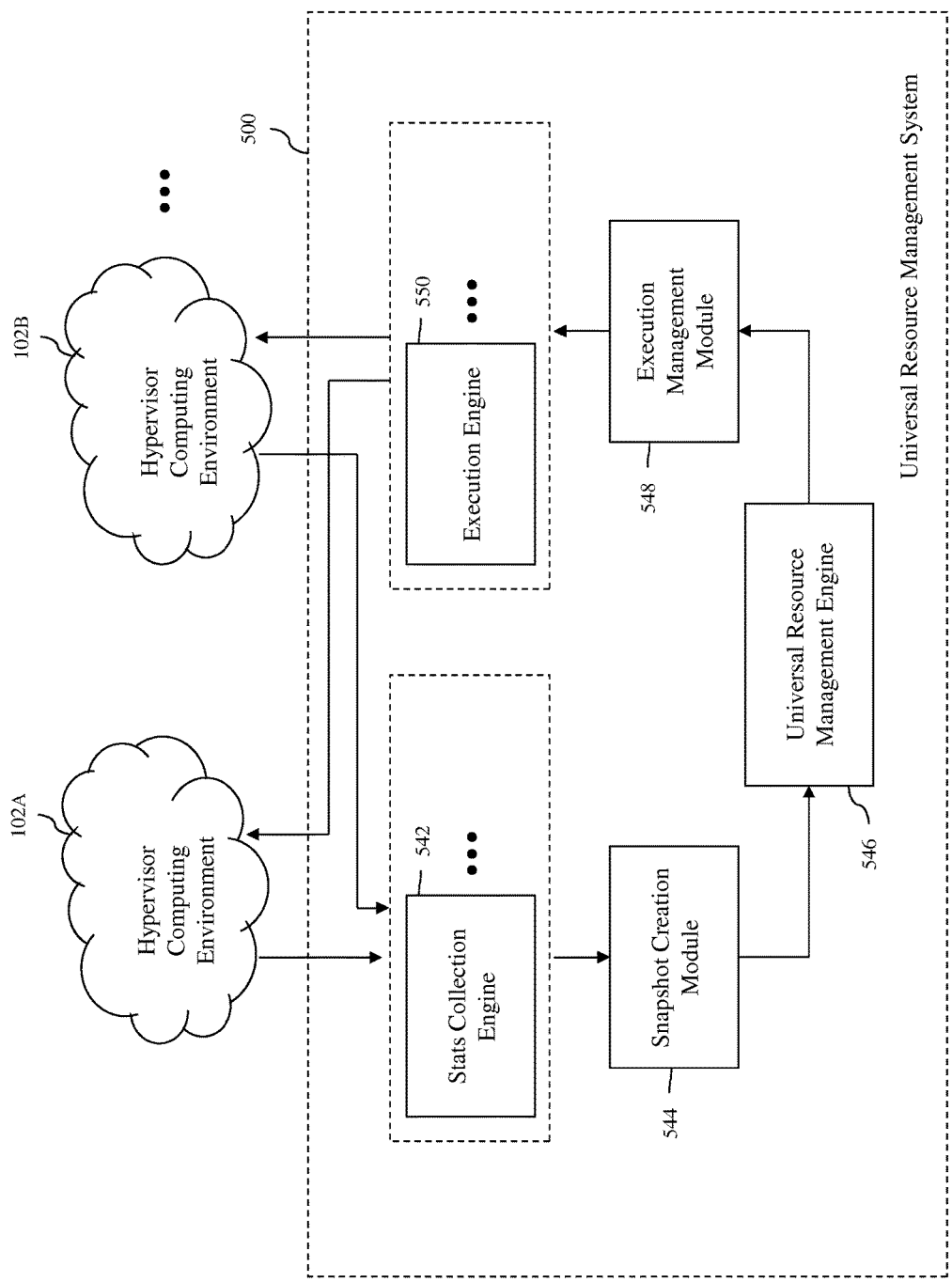
FIG. 5 illustrates a universal resource management system in accordance with a second embodiment of the invention.

Turning now to FIG. 5, a universal resource management system 500 in accordance with a second embodiment of the invention is shown. As illustrated in FIG. 5, in this embodiment, the universal resource management system operates to provide a universal resource management solution across different hypervisor computing environments 102A, 102B . . . , each of which can be viewed as an individual private cloud computing environment. In this embodiment, the universal resource management system 500 can perform resource management operations, such as client placements, load-balancing and resource allocations, for the entire multi-hypervisor environment, which includes both of the hypervisor computing environments.

The different hypervisor computing environments 102 may be similar to each other with respect to the underlying hardware, which may be used to create virtual datacenters with multiple clients operating in the virtual datacenters to execute various applications. The infrastructure 200 of FIG. 2 can be viewed as an example of an infrastructure that supports a single hypervisor computer environment. However, these different hypervisor computing environments are designed to utilize different virtualization and management software, e.g., proprietary virtualization software from different vendors, such as VMware, Inc., Microsoft Corporation and Amazon.com Inc., or open-source virtualization software, such as Openstack. Thus, each of these hypervisor computing environments may have a resource management solution that may not be compatible with the other hypervisor computing environments due to the virtualization software running in the computing environments.

In FIG. 5, the components of the universal resource management system 500 in accordance with an embodiment of the invention are shown. Similar to the universal resource management system 100, the universal resource management system 500 includes one or more analytics engines 542, a snapshot creation module 544, a universal resource management engine 546, an execution management module 548 and one or more execution engine 550. The components of the universal resource management system may be implemented in any combination of hardware, software and firmware. In one implementation, these components of the universal resource management system are implemented as one or more software programs running on one or more devices with processors, which are connected to the different hypervisor computing environments.

Each stats collection engine 542 of the universal resource management system 500 operates to collect state information regarding one or more of the different hypervisor computing environments that are compatible with that stats collection engine. The information collected by each of the stats collection engines includes, but not limited to, (1) inventory information of the objects in one or more of the different hypervisor computing environments, (2) statistics related to resource usages or demands of some or all of the inventory objects, and (3) individual configuration of some or all of the inventory objects. The inventory information for each hypervisor environment may include clients, host computers and clusters in the hypervisor environment, including their relationships, e.g., which host computers are hosting which clients and which host computers belong to which clusters. The inventory information may also include the version number, the hardware type or other attributes of the inventory objects. The statistics may include any resource usage information. As an example, the statistics collected by each stats collection engine includes, but not limited to, (a) processor or CPU statistics, such as durations when CPU was ready, free and active, (b) memory statistics, such amount of memory that was used, allocated as overhead, shared and active, and (c) other statics, such as amount of disk space used, disk input/output (I/O) latency, throughput and level of de-dupe. The individual configuration of some or all of the inventory objects may include configuration of the clients, e.g., VMs, such as resource reservations, limits and shares. The state information collected by the stats collection engine may also include policy rules, e.g., affinity and anti-affinity rules and other constraints.

Each stats collection engine 542 is designed or programmed to interface with at least one of the different hypervisor computing environments 102. As an example, some of the stats collection engines may be designed to interface with only one particular hypervisor computing environment, while other stats collection engines may be designed to interface with multiple hypervisor computing environments. Each stats collection engine may be designed to communicate with the cloud management server of each hypervisor computing environment compatible to that stats collection engine to gather the state information of the compatible hypervisor computing environment. In an implementation, at least one of the hypervisor computing environments may be a hypervisor computing environment realized using product and services provided by VMware, Inc. In this implementation, the cloud management server of each of these hypervisor computing environments is a VMware® vCenter™ server. In addition, in this implementation, the stats collection engine coupled to these VMware hypervisor computing environments is a collection engine of VMware® vCenter™ Operations Management Suite provided by VMware, Inc., which is able to communicate with the VMware® vCenter™ server.

The snapshot creation module 544 of the universal resource management system 500 operates to create universal snapshots from the state information collected by the stats collection engines 542. Thus, the snapshot creation module produces universal snapshots of the different hypervisor computing environments 102. In this context, a universal snapshot is a canonical representation of the inventory objects in all the different hypervisor computing environments, the values of their dynamic statistics, and their options or configurations at a given time. In this embodiment, a universal snapshot at a given time can be thought of as a union or composite of individual snapshots of the different hypervisor computing environments at that same given time. It is noted here that different kinds of statistics may be collected for the different hypervisor computing environments. Thus, the information about one of the different hypervisor computing environments in a universal snapshot may be different than the information about another hypervisor computing environment in the universal snapshot.

The universal resource management engine 546 of the universal resource management system 500 executes a universal resource management algorithm that converts the universal snapshots from the snapshot creation module 544 into abstract mathematical models to perform resource management analyses. In an embodiment, the process of converting the universal snapshots from the snapshot creation module into abstract mathematical models to perform resource management analyses is similar to the process performed by VMware vSphere® Distributed Resource Scheduler™ (DRS). As the universal snapshot is a union or composite of various snapshots from different hypervisor computing environments, the universal resource management algorithm can be imagined as a union of a family of corresponding algorithms that are able to operate on the snapshots to provide a host of resource management solutions similar to the solutions described above with respect to the universal resource management engine 446 of the universal resource management system 100.

The solutions that can be provided by the universal resource management engine 546 depend on the type of information collected in the universal snapshot for each of the hypervisor computing environments 102 and the levels of various levels of granularity and sophistication in the collected information. In addition, the capabilities of the platform of each of the hypervisor computing environments will dictate the solutions that may be provided by the universal resource management engine. Thus, the universal resource management engine needs capture the correct amount of details into its math model and to keep track of the capabilities of the different hypervisor computing environments to provide the right resource management services for the different hypervisor computing environments.

The results of the resource management analyses performed by the universal resource management engine 546 is a set of recommendations that are made available in the form of recommendation decks. These decks contain compound recommendations that encapsulate dependencies within individual "actions" and, if necessary, ordering between recommendations. These "actions" are the basic operations that may be performed on a resource consumer or producer. Not all actions are available on all platforms, and thus, the universal resource management engine need to consider the available actions for the different hypervisor computing environments 102. The types of actions that may be recommended by the universal resource management engine are similar to the type of actions described above with respect to the universal resource management engine 446 of the universal resource management system 100.

The execution management module 548 of the universal resource management system 500 operates to determine which actions recommended by the universal resource management engine 546 are to be performed in which hypervisor computing environments. The execution management module receives the recommended actions from the universal resource management engine and selects which recommended actions needs to be performed in the different hypervisor computing environments. The execution management module then sends the recommended actions to one or more execution engines, which can implement the recommended actions in the appropriate hypervisor computing environments.

Each execution engine 550 of the universal resource management system 500 interfaces with one or more of the different hypervisor computing environments 102 that are compatible with that execution engine to implement the recommended actions in the compatible hypervisor computing environment(s). The recommended actions may be automatically implemented by each execution engine. Alternatively, the recommended actions may be presented to an administrator for acceptance, and only the accepted recommended actions are then implemented by the execution engine. In a particular implementation, at least one of the execution engines is an execution engine of VMware® vCloud® Automation Center™ provided by VMware, Inc., which is able to perform the recommended actions on multiple platforms. In an embodiment, each execution engine interface with the cloud management server of the compatible hypervisor computing environment to execute at least some of the recommended actions in that computing environment.

In this manner, the universal resource management system 100 is able to collect information regarding the different hypervisor computing environments 102, perform resource management analyses for the entire computing environment provided by the different hypervisor computing environments, and implement any actions recommended for the different hypervisor computing environments as a result of the resource management analyses.

Figure 6:
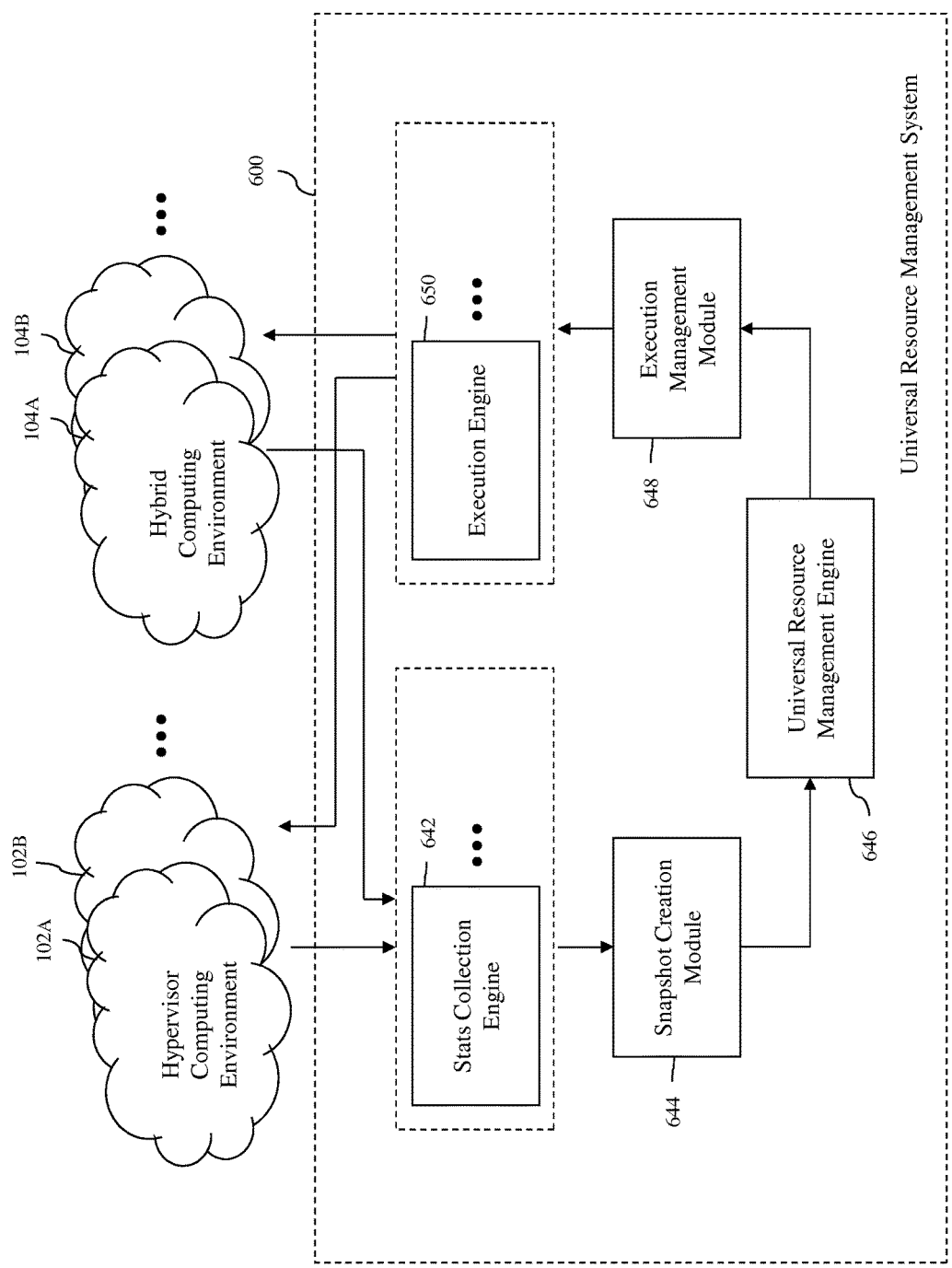
FIG. 6 illustrates a universal resource management system in accordance with a third embodiment of the invention.

Turning now to FIG. 6, a universal resource management system 600 in accordance with a third embodiment of the invention is shown. As illustrated in FIG. 6, the universal resource management system 600 operates to provide a universal resource management solution across different hypervisor computing environments 102A, 102B . . . , each of which can be viewed as an individual private cloud computing environment, and different hybrid cloud computing environments 104A, 104B . . . In this embodiment, the universal resource management system can perform resource management operations, such as client placements, load-balancing and resource allocations, for the entire environment that includes the different private cloud computing environments and one or more hybrid cloud computing environments.

In FIG. 6, the components of the universal resource management system 600 in accordance with an embodiment of the invention are shown. Similar to the universal resource management systems 100 and 500, the universal resource management system 600 includes one or more analytics engines 642, a snapshot creation module 644, a universal resource management engine 646, an execution management module 648 and one or more execution engine 650. The components of the universal resource management system 600 may be implemented in any combination of hardware, software and firmware. In one implementation, these components of the universal resource management system are implemented as one or more software programs running on one or more devices with processors, which are connected to the different hypervisor environments.

Each stats collection engine 642 of the universal resource management system 600 operates to collect state information regarding one or more of the different hypervisor computing environments 102 and the different hybrid cloud computing environments 104 that are compatible with that stats collection engine. The information collected by each stats collection engine includes, but not limited to, (1) inventory information of the objects in one or more of the compatible hypervisor and hybrid cloud computing environments, (2) statistics related to resource usages or demands of some or all of the inventory objects, and (3) individual configuration of some or all of the inventory objects. The inventory information for each computing environment may include clients, host computers and clusters in the computing environment, including their relationships, e.g., which host computers are hosting which clients and which host computers belong to which clusters. The inventory information may also include the version number, the hardware type or other attributes of the inventory objects. The statistics may include any resource usage information. As an example, the statistics collected by each stats collection engine includes, but not limited to, (a) processor or CPU statistics, such as durations when CPU was ready, free and active, (b) memory statistics, such amount of memory that was used, allocated as overhead, shared and active, and (c) other statics, such as amount of disk space used, disk input/output (I/O) latency, throughput and level of de-dupe. The individual configuration of some or all of the inventory objects may include configuration of the clients, e.g., VMs, such as resource reservations, limits and shares. The state information collected by the stats collection engine may also include policy rules, e.g., affinity and anti-affinity rules and other constraints.

Each stats collection engine 542 is designed or programmed to interface with at least one of the different hypervisor and hybrid cloud computing environments 102 and 104. As an example, some of the stats collection engines may be designed to interface with only one particular computing environment, while other stats collection engines may be designed to interface with multiple computing environments, which may include at least one hypervisor computing environment and at least on hybrid cloud computing environment. Each stats collection engine may be designed to communicate with the cloud management server of each computing environment compatible to that stats collection engine to gather the state information of the compatible computing environment. In an implementation, at least one of the hypervisor computing environments may be a hypervisor environment realized using products and/or services provided by VMware, Inc., and at least one of the hybrid computing environments may be a hybrid cloud computing environment also realized using products and/or services provided by VMware, Inc. In this implementation, the cloud management server of the VMware hypervisor environment is a VMware® vCenter™ server and the cloud management server of the public cloud is a cloud management server of VMware® vCloud® Hybrid Service™. In addition, in this implementation, the stats collection engine coupled to these VMware computing environments is a collection engine of VMware® vCenter™ Operations Management Suite provided by VMware, Inc., which is able to communicate with the VMware® vCenter™ server of the VMware hypervisor and the cloud management server of the VMware hybrid cloud environment.

The snapshot creation module 644 of the universal resource management system 600 operates to create universal snapshots from the state information collected by the stats collection engines 642. Thus, the snapshot creation module produces universal snapshots of the different hypervisor and hybrid cloud computing environments 102 and 104. In this context, a universal snapshot is a canonical representation of the inventory objects in all the different hypervisor and hybrid cloud computing environments, the values of their dynamic statistics, and their options or configurations at a given time. In this embodiment, a universal snapshot at a given time can be thought of as a union or composite of individual snapshots of the different hypervisor and hybrid cloud computing environments at that same given time. It is noted here that different kinds of statistics may be collected for the different hypervisor and hybrid cloud computing environments. Thus, the information about one of the different hypervisor and hybrid cloud computing environments in the universal snapshot may be different than the information about another computing environment in the universal snapshot.

The universal resource management engine 646 of the universal resource management system 600 executes a universal resource management algorithm that converts the universal snapshots from the snapshot creation module 644 into abstract mathematical models to perform resource management analyses. In an embodiment, the process of converting the universal snapshots from the snapshot creation module into abstract mathematical models to perform resource management analyses is similar to the process performed by VMware vSphere® Distributed Resource Scheduler™ (DRS). As the universal snapshot is a union or composite of various snapshots from different hypervisor computing environments, the universal resource management algorithm can be imagined as a union of a family of corresponding algorithms that are able to operate on the snapshots to provide a host of resource management solutions similar to the solutions described above with respect to the universal resource management engines 446 of the universal resource management system 100.

The solutions that can be provided by the universal resource management engine 646 depend on the type of information collected in the universal snapshot for each of the computing environments 102 and 104, and the levels of various levels of granularity and sophistication in the collected information. In addition, the capabilities of the platform of each of the clouds will dictate the services that can be provided by the universal resource management engine. Thus, the universal resource management engine needs capture the correct amount of detail into its math model and to keep track of the capabilities of the different hypervisor and hybrid cloud computing environments and to provide the right resource management solutions for the computing environments.

The results of the resource management analyses performed by the universal resource management engine 646 is a set of recommendations that are made available in the form of recommendation decks. These decks contain compound recommendations that encapsulate dependencies within individual "actions" and, if necessary, ordering between recommendations. These "actions" are the basic operations that may be performed on a resource consumer or producer. Not all actions are available on all platforms, and thus, the universal resource management engine need to consider the available actions for the different hypervisor and hybrid cloud computing environments 102 and 104. The types of actions that may be recommended by the resource management engine 646 are similar to the type of actions described above with respect to the universal resource management engine 446 of the universal resource management system 100.

The execution management module 648 of the universal resource management system 600 operates to determine which actions recommended by the universal resource management engine 646 are to be performed in which hypervisor and hybrid cloud computing environments. The execution management module receives the recommended actions from the universal resource management engine and selects which recommended actions needs to be performed in the different computing environments. The execution management module then sends the recommended actions to one or more execution engines, which can implement the recommended actions in the appropriate computing environments.

Each execution engine 650 of the universal resource management system 600 interfaces with one or more of the different hypervisor and hybrid cloud computing environments 102 and 104 that are compatible with that execution engine to implement the recommended actions in the compatible computing environment(s). The recommended actions may be automatically implemented by each execution engine. Alternatively, the recommended actions may be presented to an administrator for acceptance, and only the accepted recommended actions are then implemented by the execution engine. In an implementation, at least one of the execution engines is an execution engine of VMware® vCloud® Automation Center™ provided by VMware, Inc., which is able to perform the recommended actions on various platforms. In an embodiment, each execution engine interface with the cloud management server of the compatible hypervisor or hybrid cloud computing environment to execute at least some of the recommended actions in that computing environment.

In this manner, the universal resource management system 600 is able to collect information regarding different hypervisor and hybrid cloud computing environments 102 and 104, perform resource management analyses for the entire computing environment provided by the different computing environments, and execute any actions recommended for the different computing environments as a result of the resource management analyses.

In some embodiments, the universal resource management system 100, 500 or 600 may be a distributed system in which at least some of the components of the system are distributed among different devices with processors to perform operations associated with the services provided by the system. In these embodiments, some of the components of the universal resource management system may reside in one or more devices that are part of any hypervisor computing environment or part of any hybrid or public computing environment.

In some embodiments, the functionalities of the universal resource management system 100, 500 or 600 may be provided as a service to an entity. As a service, the system will be able to efficiently manage any computing environment, regardless of the size of its inventory. Thus, in these embodiments, the entity receiving the service can scale its computing environment without have to worry about resource management. As a service, there would be no need for users of private and/or hybrid cloud computing environments to install or upgrade their resource management products. In addition, critical bugs can be addressed much more expediently as the quality assurance regression footprint for patches should be relatively small. Furthermore, as a service, it is possible to provide customized resource management solutions to users via user profiles. Lastly, as a service, the universal resource management system provides a central store of debug information that can be used for advanced modeling solutions.

Figure 7:
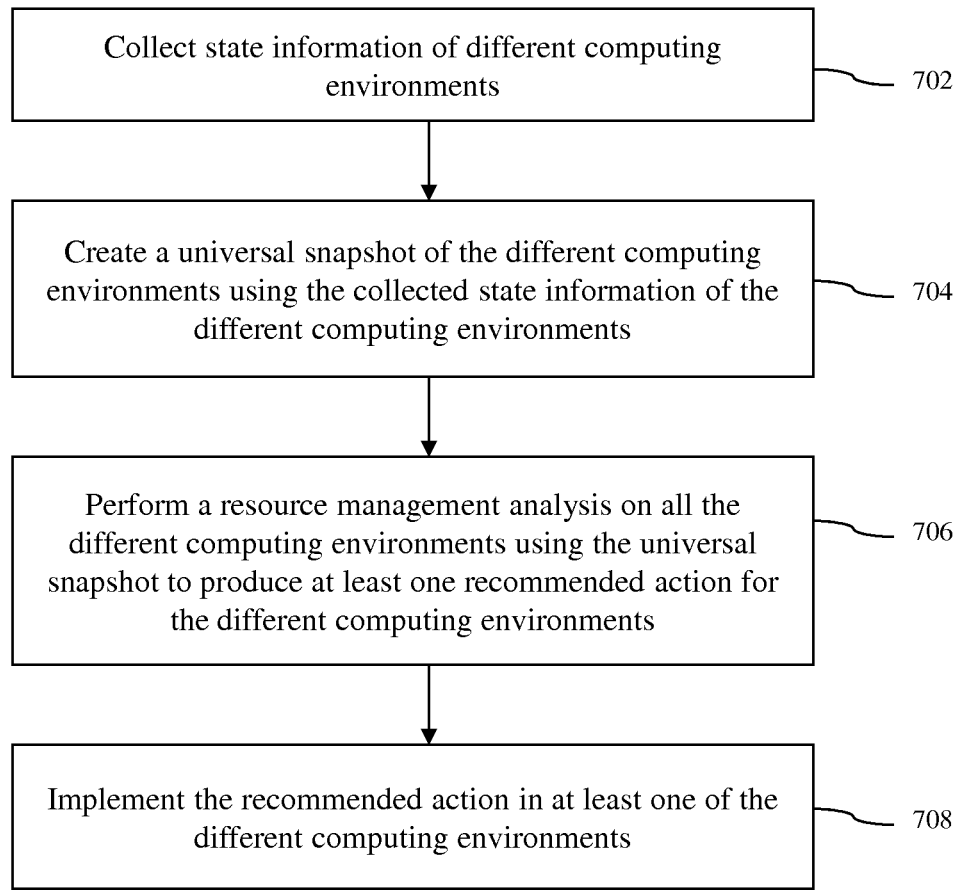
FIG. 7 is a flow diagram of a method for performing resource management operations for different computing environments in accordance with an embodiment of the invention.

A method for performing resource management operations for different computing environments in accordance with an embodiment of the invention is described with reference to a flow diagram of FIG. 7. At block 702, state information of state information of each of the different computing environments are collected. At block 704, a universal snapshot of all the different computing environments is created using the collected state information of the different computing environments. At block 706, a resource management analysis is on all the different computing environments using the universal snapshot to produce at least one recommended action for the different computing environments. At block 708, the recommended action is implemented in at least one of the different computing environments.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for performing universal resource management operations for first and second virtualized computing environments, wherein a first virtualization software is running in hosts of the first virtualized computing environment and a second virtualization software is running in hosts of the second virtualized computing environment, and the first virtualization software and the second virtualization software are of different types, the method comprising:

establishing a hybrid computing environment that comprises the first virtualized computing environment and the second virtualized computing environments for a first entity, wherein the first virtualized computing environment is operated by the first entity, wherein the second virtualized computing environment is an extension of the first virtualized computing environment and operated by a second entity;

collecting state information of each of the first and second virtualized computing environments, wherein the collected state information includes inventory information of objects in the first and second virtualized computing environments, the objects including virtual machines, host computers, and relationships therebetween including which host computers are hosting which virtual machines;

creating a universal snapshot of the first and second virtualized computing environments using the collected state information of the first and second virtualized computing environments;

performing a resource management analysis on the first and second virtualized computing environments using the universal snapshot to produce a recommended action for the first and second virtualized computing environments; and implementing the recommended action in at least one of the first and second virtualized computing environments, wherein the recommended action comprises a live migration of a client between the first virtualized computing environment and the second virtualized computing environment, wherein implementing the recommended action in at least one of the first and second virtualized computing environments includes interfacing with a management server to execute the recommended action.

2. The method of claim 1, wherein at least one of the first and second virtualized computing environments is a private cloud computing environment and at least one of the first and second virtualized computing environments is a hybrid cloud computing environment.

3. The method of claim 1, wherein the collecting of the state information of each of the first and second virtualized computing environments includes interfacing with a cloud management server of at least one of the first and second virtualized computing environments to collect the state information thereof.

4. The method of claim 1, wherein the universal snapshot is a composite of snapshots of the first and second virtualized computing environments.

5. The method of claim 1, wherein the recommend action is client power-on, or resource setting action.

6. The method of claim 1, wherein the recommended action comprises a first recommended action and a second recommended action, and the method further comprises determining to implement the first recommended action in the first virtualized computer environment and to implement the second recommended action in the second virtualized computer environment.

7. A non-transitory computer-readable storage medium containing program instructions for performing resource management operations for first and second virtualized computing environments, wherein a first virtualization software is running in hosts of the first virtualized computing environment and a second virtualization software is running in hosts of the second virtualized computing environment, and the first virtualization software and the second virtualization software are of different types, and wherein execution of the program instructions by one or more processors of a computer system causes the one or more processors to perform a method comprising:
 collecting state information of each of the first and second virtualized computing environments, wherein the collected state information includes inventory information of objects in the first and second virtualized computing environments, the objects including virtual machines, host computers, and relationships therebetween including which host computers are hosting which virtual machines;
 creating a universal snapshot of the first and second virtualized computing environments using the collected state information of the first and second virtualized computing environments;
 performing a resource management analysis on the first and second virtualized computing environments using the universal snapshot to produce at least one recommended action for the first and second virtualized computing environments; and
 implementing the recommended action in at least one of the first and second virtualized computing environments, wherein the recommended action comprises a live migration of a client between the first virtualized computing environment and the second virtualized computing environment, wherein implementing the recommended action in at least one of the first and second virtualized computing environments includes interfacing with a management server to execute the recommended action.

8. The non-transitory computer-readable storage medium of claim 7, wherein at least one of the first and second virtualized computing environments is a private cloud computing environment and at least one of the first and second virtualized computing environments is a hybrid cloud computing environment.

9. The non-transitory computer-readable storage medium of claim 7, wherein the collecting of the state information of each of the first and second virtualized computing environments includes interfacing with a cloud management server of at least one of the first and second virtualized computing environments to collect the state information thereof.

10. The non-transitory computer-readable storage medium of claim 7, wherein the universal snapshot is a composite of snapshots of the first and second virtualized computing environments.

11. The non-transitory computer-readable storage medium of claim 7, wherein the collected state information includes data related to resource usage of the objects and configuration settings for the objects.

12. A universal resource management system for first and second virtualized computing environments, wherein a first virtualization software is running in hosts of the first virtualized computing environment and a second virtualization software is running in hosts of the second virtualized computing environment, and the first virtualization software and the second virtualization software are of different types, said system comprising:
 memory; and
 a processor coupled to the memory and containing instructions configuring the processor to:
  collect state information of each of the first and second virtualized computing environments, wherein the collected state information includes inventory information of objects in the first and second virtualized computing environments, the objects including virtual machines, host computers, and relationships therebetween including which host computers are hosting which virtual machines;
  create a universal snapshot of the first and second virtualized computing environments using the collected state information of the first and second virtualized computing environments;
  perform a resource management analysis on the first and second virtualized computing environments using the universal snapshot to produce at least one recommended action for the first and second virtualized computing environments; and
  implement the recommended action in at least one of the first and second virtualized computing environments, wherein the recommended action comprises a live migration of a client between the first virtualized computing environment and the second virtualized computing environment, wherein implementing the recommended action in at least one of the first and second virtualized computing environments includes interfacing with a management server to execute the recommended action.

13. The universal resource management system of claim 12, wherein at least one of the first and second virtualized computing environments is a private cloud computing environment and at least one of the first and second virtualized computing environments is a hybrid cloud computing environment.

14. The universal resource management system of claim 12, wherein the processor is configured to interface with a cloud management server of at least one of the first and second virtualized computing environments to collect the state information thereof.

15. The universal resource management system of 12, wherein the collected state information includes data related to resource usage of the objects and configuration settings for the objects.

* * * * *